(12) United States Patent
Nojima (10) Patent No.: US 11,195,549 B1
(45) Date of Patent: Dec. 7, 2021

(54) DISK DEVICE WITH FLEXURE WIRING SPACING CONFIGURATION

(71) Applicants: Kabushiki Kaisha Toshiba, Tokyo (JP); Toshiba Electronic Devices & Storage Corporation, Tokyo (JP)

(72) Inventor: Yusuke Nojima, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/198,586

(22) Filed: Mar. 11, 2021

(30) Foreign Application Priority Data

Sep. 18, 2020 (JP) .............................. JP2020-157786

(51) Int. Cl.
  *G11B 5/48* (2006.01)
  *G11B 5/55* (2006.01)
  *G11B 5/596* (2006.01)

(52) U.S. Cl.
  CPC ............ *G11B 5/4853* (2013.01); *G11B 5/483* (2015.09); *G11B 5/484* (2013.01); *G11B 5/486* (2013.01); *G11B 5/4833* (2013.01); *G11B 5/4873* (2013.01); *G11B 5/5552* (2013.01); *G11B 5/596* (2013.01)

(58) Field of Classification Search
  None
  See application file for complete search history.

(56) References Cited

U.S. PATENT DOCUMENTS

| | | | |
|---|---|---|---|
| 8,144,436 | B2 | 3/2012 | Iriuchijima et al. |
| 8,149,542 | B2 | 4/2012 | Ando |
| 8,199,442 | B2 | 6/2012 | Okawara et al. |
| 8,248,734 | B2 | 8/2012 | Fuchino |
| 8,754,575 | B2 | 6/2014 | Ikeji et al. |
| 8,921,707 | B2 | 12/2014 | Ohnuki |
| 9,311,938 | B1 | 4/2016 | Ee et al. |
| 9,406,314 | B1 | 8/2016 | Hahn et al. |
| 10,566,016 | B2 | 2/2020 | Yamada et al. |
| 2010/0246071 | A1 | 9/2010 | Nojima et al. |
| 2020/0265866 | A1 | 8/2020 | Suzuki |

FOREIGN PATENT DOCUMENTS

JP  2020-135906 A  8/2020

*Primary Examiner* — Craig A. Renner
(74) *Attorney, Agent, or Firm* — Allen & Overy LLP (57) ABSTRACT

According to one embodiment, a disk device includes a recording medium, electronic components including a magnetic head, a flexure, and an adhesive. The flexure includes a surface on which the electronic component is mounted, a first wiring and a second wiring each extending along the surface, and a groove provided on the surface between the first/second wirings. The adhesive is in contact with an inner surface of the groove and includes an adhesive portion attaching the electronic component to the surface. A first portion in the flexure is provided in a position apart from the electronic component. A second portion in the flexure is positioned closer to the adhesive portion than the first portion. A distance between the first wiring and the second wiring is larger than that in the first portion.

10 Claims, 7 Drawing Sheets

DISK DEVICE WITH FLEXURE WIRING SPACING CONFIGURATION

CROSS-REFERENCE TO RELATED APPLICATIONS

This application is based upon and claims the benefit of priority from Japanese Patent Application No. 2020-157786, filed on Sep. 18, 2020, the entire contents of which are incorporated herein by reference.

FIELD

Embodiments described herein relate generally to a disk device.

BACKGROUND

A disk device such as a hard disk drive includes a magnetic disk and a magnetic head that reads information from the magnetic disk and writes information to the magnetic disk. The magnetic head is mounted on a flexible flexure. Various electronic components, such as the magnetic head, an actuator for moving the magnetic head, and a laser element for heating a magnetic disk, are fixed to a flexure by an adhesive, for example.

On the flexure, a plurality of wiring patterns extend side by side. By providing the wiring patterns, a ridge is formed on the surface of the flexure. Therefore, a recessed groove may be formed on the surface of the flexure between two wiring patterns. There is a possibility that the adhesive flows out to an unexpected range along the groove due to, for example, a capillary phenomenon.

DETAILED DESCRIPTION

According to one embodiment, a disk device includes a disk-shaped recording medium, one or more electronic components, a flexible flexure, and an adhesive. The disk-shaped recording medium includes a recording layer. The one or more electronic components include a magnetic head configured to read information from the recording medium and write information to the recording medium. The flexible flexure includes: a surface on which the one or more electronic components are mounted; a first wiring extending along the surface; a second wiring extending along the surface; and a groove provided on the surface between the first wiring and the second wiring. The adhesive includes an adhesive portion and is in contact with an inner surface of the groove, the adhesive portion being positioned between the surface and one of the one or more electronic components and attaching the one electronic component to the surface. The flexure includes: a first portion provided in a position apart from the electronic component, the first wiring and the second wiring in the first portion extending side by side; and a second portion positioned closer to the adhesive portion than the first portion, a distance between the first wiring and the second wiring in the second portion being larger than that in the first portion.

First Embodiment

The first embodiment will be described below with reference to FIGS. 1 to 4. In this specification, constituent elements according to the embodiment and the description of the elements may be mentioned in a plurality of expressions. The constituent elements and description thereof are examples, and are not limited by the expressions in the specification. The constituent element may also be specified by names different from those in the specification. The constituent elements may also be explained by expressions different from those in the specification.

Figure 1:
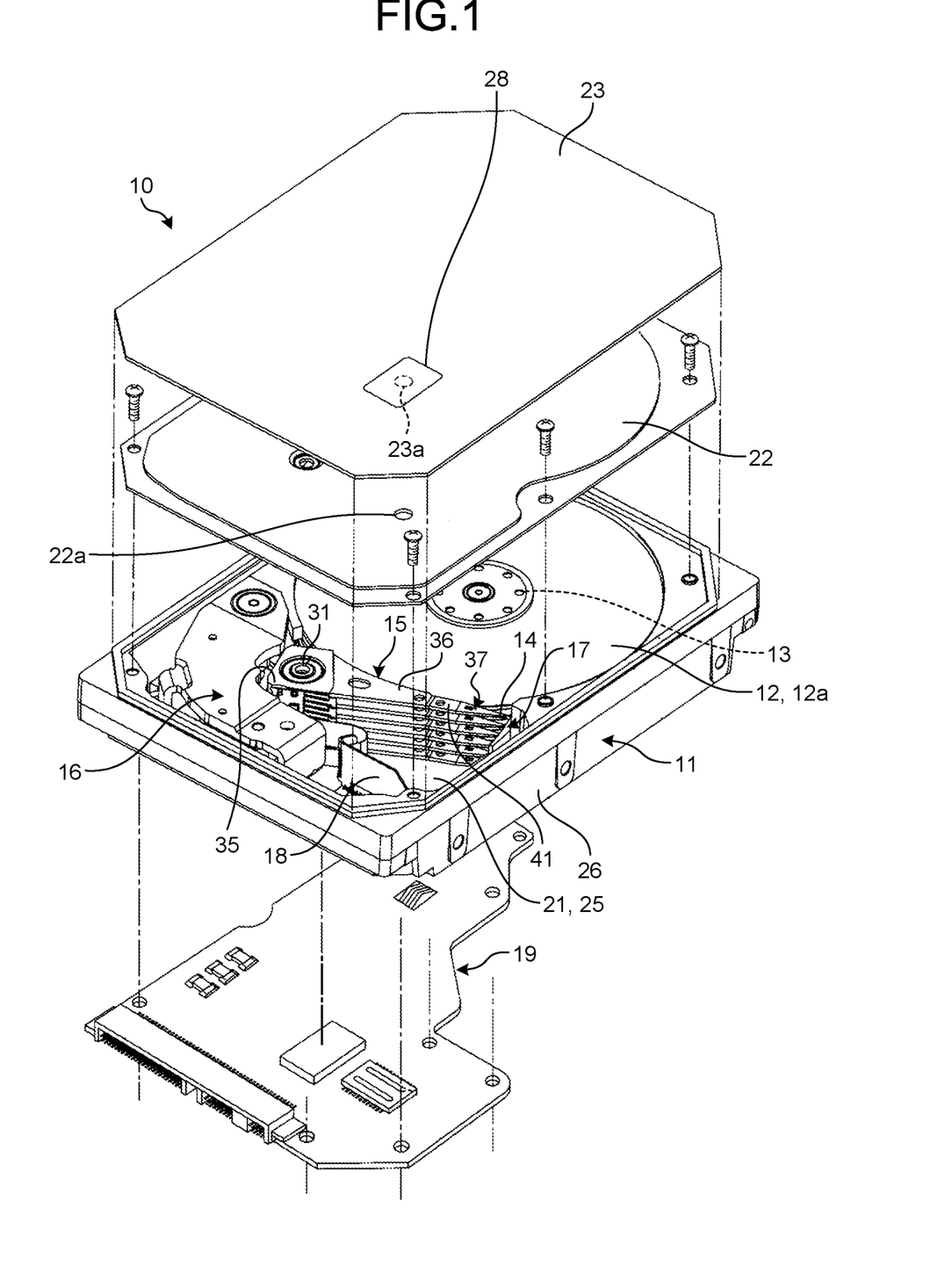
FIG. 1 is an exemplary perspective view illustrating a hard disk drive (HDD) according to a first embodiment.

FIG. 1 is an exemplary perspective view illustrating a hard disk drive (HDD) 10 according to a first embodiment. The HDD 10 is an example of a disk device, and may also be referred to as an electronic device, a storage device, an external storage device, or a magnetic disk device.

The HDD 10 includes a housing 11, a plurality of magnetic disks 12, a spindle motor 13, a plurality of magnetic heads 14, an actuator assembly 15, a voice coil motor (VCM) 16, a ramp load mechanism 17, a flexible printed circuit (FPC) 18, and a printed circuit board (PCB) 19. The magnetic disk 12 is an example of a recording medium. The magnetic head 14 may also be referred to as a slider.

The housing 11 has a base 21, an inner cover 22, and an outer cover 23. The base 21 is a bottomed container and includes a bottom wall 25 and a side wall 26. The bottom wall 25 is formed in a substantially rectangular plate shape (quadrangle). The side wall 26 protrudes from an edge of the bottom wall 25. The bottom wall 25 and the side wall 26 are made of a metal material such as an aluminum alloy, and are integrally formed.

The inner cover 22 and the outer cover 23 are made of a metal material such as an aluminum alloy. For example, the inner cover 22 is attached to the end portion of the side wall 26 by a screw. For example, the outer cover 23 covers the inner cover 22, and is airtightly fixed to the end portion of the side wall 26 by welding.

The inside of the housing 11 is sealed. The magnetic disk 12, the spindle motor 13, the magnetic head 14, the actuator assembly 15, the VCM 16, the ramp load mechanism 17, and the FPC 18 are disposed inside the housing 11.

The inner cover 22 is provided with an air vent 22a. Further, the outer cover 23 is provided with an air vent 23a. After the components are mounted in the base 21, and the inner cover 22 and the outer cover 23 are attached to the base 21, air inside the housing 11 is evacuated from the air vents 22a and 23a. Further, a gas different from the air is filled in the housing 11.

The gas filled in the housing 11 is, for example, a low-density gas having a density lower than that of air, an inert gas having a low reactivity, or the like. For example, helium is filled in the housing 11. Other fluids may be filled in the housing 11. Further, the inside of the housing 11 may be maintained at a vacuum, a low pressure close to a vacuum, or a negative pressure lower than the atmospheric pressure.

The air vent 23a of the outer cover 23 is sealed by a seal 28. The seal 28 airtightly seals the air vent 23a and prevents the fluid filled in the housing 11 from leaking from the air vent 23a.

The magnetic disk 12 is a disk-shaped recording medium having a magnetic recording layer provided on a surface 12a such as an upper surface and a lower surface. The diameter of the magnetic disk 12 is, for example, 3.5 inches, but is not limited to this example.

The spindle motor 13 supports and rotates a plurality of magnetic disks 12 stacked at an interval in a direction that the surface 12a faces. For example, the magnetic disks 12 are held on a hub of the spindle motor 13 by a clamp spring.

The magnetic head 14 records information to the recording layer of the magnetic disk 12 and reproduces information from the recording layer of the magnetic disk 12. In other words, the magnetic head 14 reads information from the magnetic disk 12 and writes information to the magnetic disk 12. The magnetic head 14 is mounted on the actuator assembly 15.

The actuator assembly 15 is rotatably supported by a support shaft 31 disposed in a position apart from the magnetic disk 12. The VCM 16 rotates the actuator assembly 15, and disposes the actuator assembly 15 in the desired position. When the magnetic head 14 is moved to the outermost periphery of the magnetic disk 12 by the VCM 16 rotating the actuator assembly 15, the ramp load mechanism 17 holds the magnetic head 14 in an unload position apart from the magnetic disk 12.

The actuator assembly 15 includes an actuator block 35, a plurality of arms 36, and a plurality of head suspension assemblies (suspension) 37. The suspension 37 may be referred to as a head gimbal assembly (HGA).

For example, the actuator block 35 is rotatably supported by the support shaft 31 via a bearing. The arms 36 protrudes in a direction substantially orthogonal to the support shaft 31 from the actuator block 35. The actuator assembly 15 may be divided, and the arm 36 may protrude from each of the actuator blocks 35.

The arms 36 are arranged at an interval in a direction that the support shaft 31 extends. Each of the arms 36 is formed in a plate shape such that each of the arms 36 are allowed to enter between adjacent magnetic disks 12. The arms 36 extend substantially in parallel.

For example, the actuator block 35 and the arms 36 are integrally formed of aluminum. Materials of the actuator block 35 and the arms 36 are not limited to this example.

A voice coil of the VCM 16 is provided on a protrusion protruding from the actuator block 35 to the opposite side of the arm 36. The VCM 16 includes a pair of yokes, a voice coil arranged between the yokes, and a magnet provided on the yokes.

As described above, the VCM 16 rotates the actuator assembly 15. In other words, the VCM 16 integrally rotates (moves) the actuator block 35, the arm 36, and the suspension 37.

The suspension 37 is attached to a tip portion of the corresponding arm 36, and protrudes from the arm 36. According to this, the suspensions 37 are arranged at an interval in a direction that the support shaft 31 extends.

Figure 2:
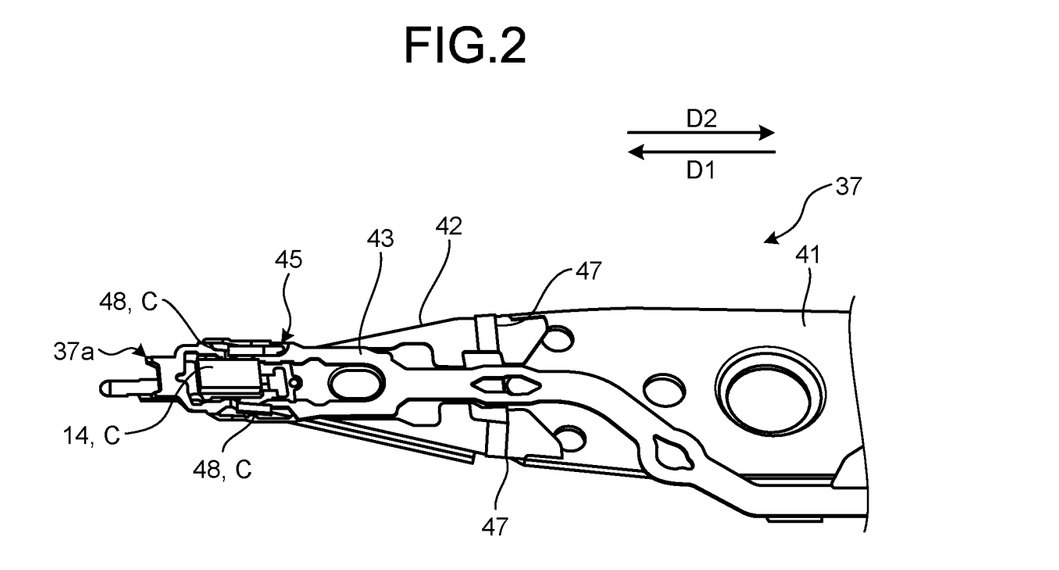
FIG. 2 is an exemplary perspective view illustrating part of a suspension of the first embodiment.

FIG. 2 is an exemplary perspective view illustrating part of the suspension 37 of the first embodiment. As illustrated in FIG. 2, in the present specification, a first direction D1 and a second direction D2 are defined for convenience. The first direction D1 is a direction that the suspension 37 extends from the arm 36. The arm 36 also extends from the actuator block 35 in the first direction D1. The second direction D2 is the opposite direction of the first direction D1. The first direction D1 and the second direction D2 are the longitudinal directions of the arm 36 and the suspension 37.

Each of the suspensions 37 includes a base plate 41, a load beam 42, and a flexure 43. Further, the magnetic head 14 is disposed on a tip portion 37a of the suspension 37. The tip portion 37a is an end portion of the suspension 37 in the first direction D1. The end portion of the suspension 37 in the second direction D2 is attached to the arm 36. In the present specification, the end portion includes not only an end of the element but also a portion in the vicinity of the end.

The base plate 41 and the load beam 42 are made of stainless steel, for example. The materials of the base plate 41 and the load beam 42 are not limited to this example. The base plate 41 is formed in a plate shape, and is attached to the tip portion of the arm 36. The load beam 42 is formed in a plate shape thinner than the base plate 41. The load beam 42 is attached to a tip portion of the base plate 41, and protrudes from the base plate 41.

The flexure 43 is formed in an elongated belt shape. The shape of the flexure 43 is not limited to this example. The flexure 43 is a flexible stacked plate including a metal plate (a backing layer) made of stainless, an insulation layer formed on the metal plate, a conduction layer configuring a plurality of wirings (wiring patterns) formed on the insulation layer, and a protection layer (an insulation layer) covering the conduction layer.

A gimbal portion (elastic support portion) 45, which is positioned on the load beam 42 and is displaceable, is provided on the end portion of the flexure 43 in the first direction D1. The gimbal portion 45 is provided on the tip portion 37a of the suspension 37. The magnetic head 14 is mounted on the gimbal portion 45 of the flexure 43. The end portion of the flexure 43 in the second direction D2 is connected to the FPC 18. According to this, the FPC 18 is electrically connected to the magnetic head 14 via the wiring of the flexure 43.

A pair of first micro actuators (MAs) 47 and a pair of second micro actuators (MAs) 48 are mounted on the suspension 37. The first MAs 47 and the second MAs 48 are piezoelectric elements. For example, the first MAs 47 and the second MAs 48 are bulk type of piezoelectric elements. The first MAs 47 and the second MAs 48 may be bulk stacked type or thin film type of piezoelectric elements. The first MAs 47 and the second MAs 48 are not limited to this example.

For example, each of the first MAs 47 connects the base plate 41 and the load beam 42. The end portion of the first MA 47 in the first direction D1 is attached to the load beam 42, and the end portion of the first MA 47 in the second direction D2 is attached to the base plate 41. The installation manner of the first MA 47 is not limited to this example. The first MAs 47 are disposed orthogonal to the first direction D1 and the second direction D2, and disposed apart from each other in a direction (width direction) along the surface 12a of the magnetic disk 12.

The first MA 47 can expand and contract in the first direction D1 and the second direction D2 depending on the applied voltage. Since the first MAs 47 expand and contract individually, a portion of the suspension 37 closer to the tip portion 37a than the first MA 47 is elastically bent in a width direction. According to this, the first MAs 47 move the magnetic head 14 mounted on the tip portion 37a of the suspension 37.

The second MAs 48 are disposed near the tip portion 37a of the suspension 37. For example, the second MAs 48 are mounted on the gimbal portion 45. The second MAs 48 are disposed apart from each other in the width direction.

The second MAs 48 can expand and contract in the first direction D1 and the second direction D2 depending on the applied voltage. Since the second MAs 48 expand and contract individually, the tip portion 37a of the suspension 37 is elastically bent in the width direction. According to this, the second MAs 48 move the magnetic head 14 mounted on the tip portion 37a of the suspension 37.

As described above, the HDD 10 of the present embodiment adjusts a position of the magnetic head 14 by a triple stage actuator (TSA) method that is a method of moving the magnetic head 14 by using the VCM 16, the first MA 47, and the second MA 48. The HDD 10 is not limited to this example, and may adjust a position of the magnetic head 14 by a dual stage actuator (DSA) method that is a method of moving the magnetic head 14 by using the VCM 16 and the first MA 47.

The PCB 19 illustrated in FIG. 1 is, for example, a rigid substrate such as a glass epoxy substrate, and is a multilayer substrate or a build-up substrate. The PCB 19 is disposed outside the housing 11, and is attached to the outside of the bottom wall 25 of the base 21. For example, the PCB 19 is attached to the bottom wall 25 by a plurality of screws.

Various electronic components, such as a relay connector that is connected to the FPC 18, an interface (I/F) connector that is connected to a host computer, and a controller that controls an operation of the HDD 10, are mounted on the PCB 19. The relay connector is electrically connected to the FPC 18 via the connector provided on the bottom wall 25.

Figure 3:
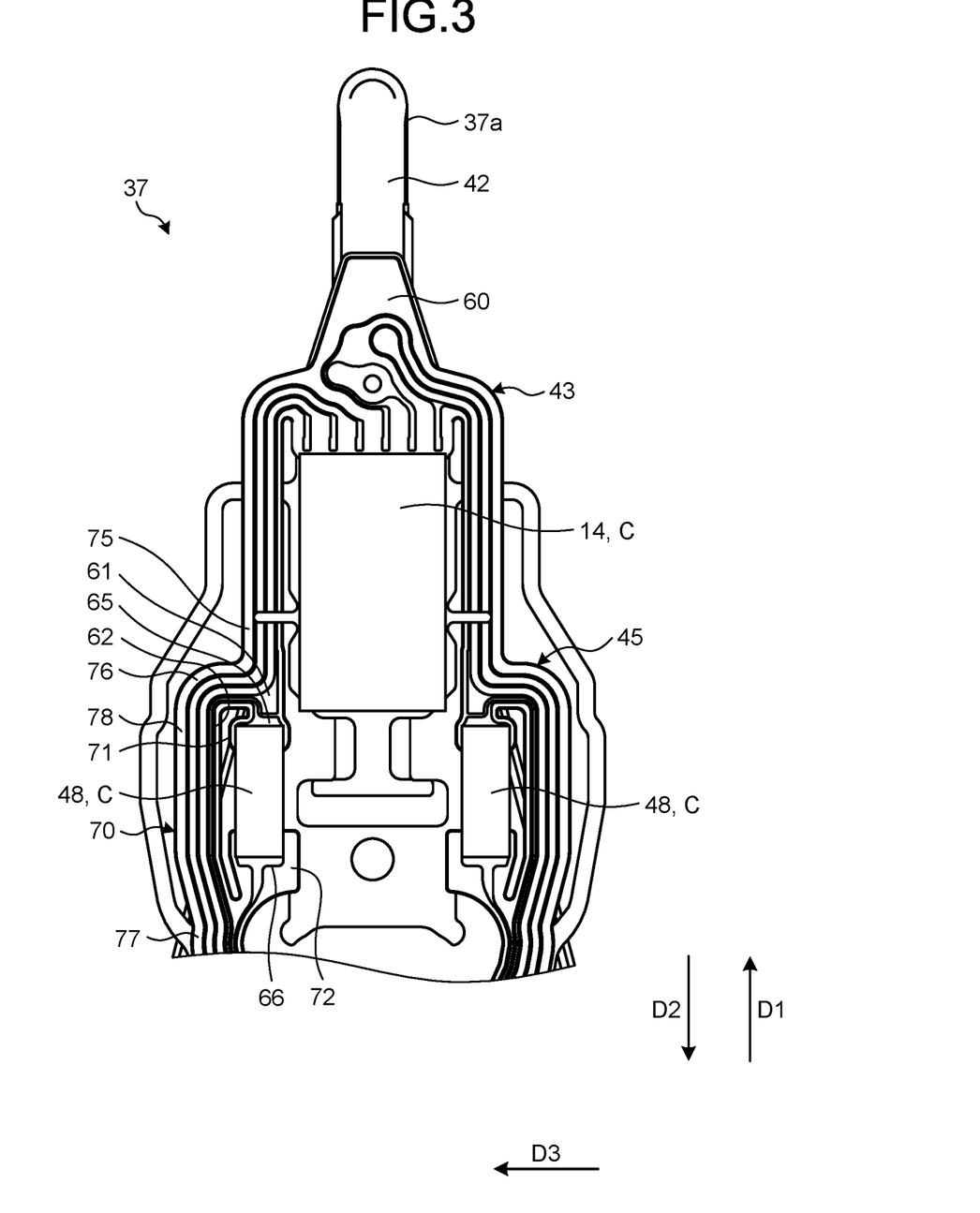
FIG. 3 is an exemplary plan view illustrating part of the suspension of the first embodiment.

FIG. 3 is an exemplary plan view illustrating part of the suspension 37 of the first embodiment. As described above, the flexure 43 is a stacked plate including a metal plate, an insulation layer, a conduction layer, and a protection layer. As illustrated in FIG. 3, the flexure 43 includes a surface 60, a first wiring 61, and a second wiring 62.

The surface 60 is formed approximately flat. The surface 60 may be provided with fine irregularities. When the magnetic head 14 is positioned on the magnetic disk 12, the surface 60 faces the surface 12a of the magnetic disk 12. For example, the surface 60 is formed of a protection layer, and has an insulation property.

The magnetic head 14 is mounted on the surface 60. For example, a plurality of pads (lands) are provided on the surface 60. The pads are exposed through holes provided in the protection layer forming the surface 60. For example, a terminal of the magnetic head 14 is connected to the pad of the surface 60 by a solder. Further, for example, the magnetic head 14 is fixed to the surface 60 by an adhesive.

Figure 4:
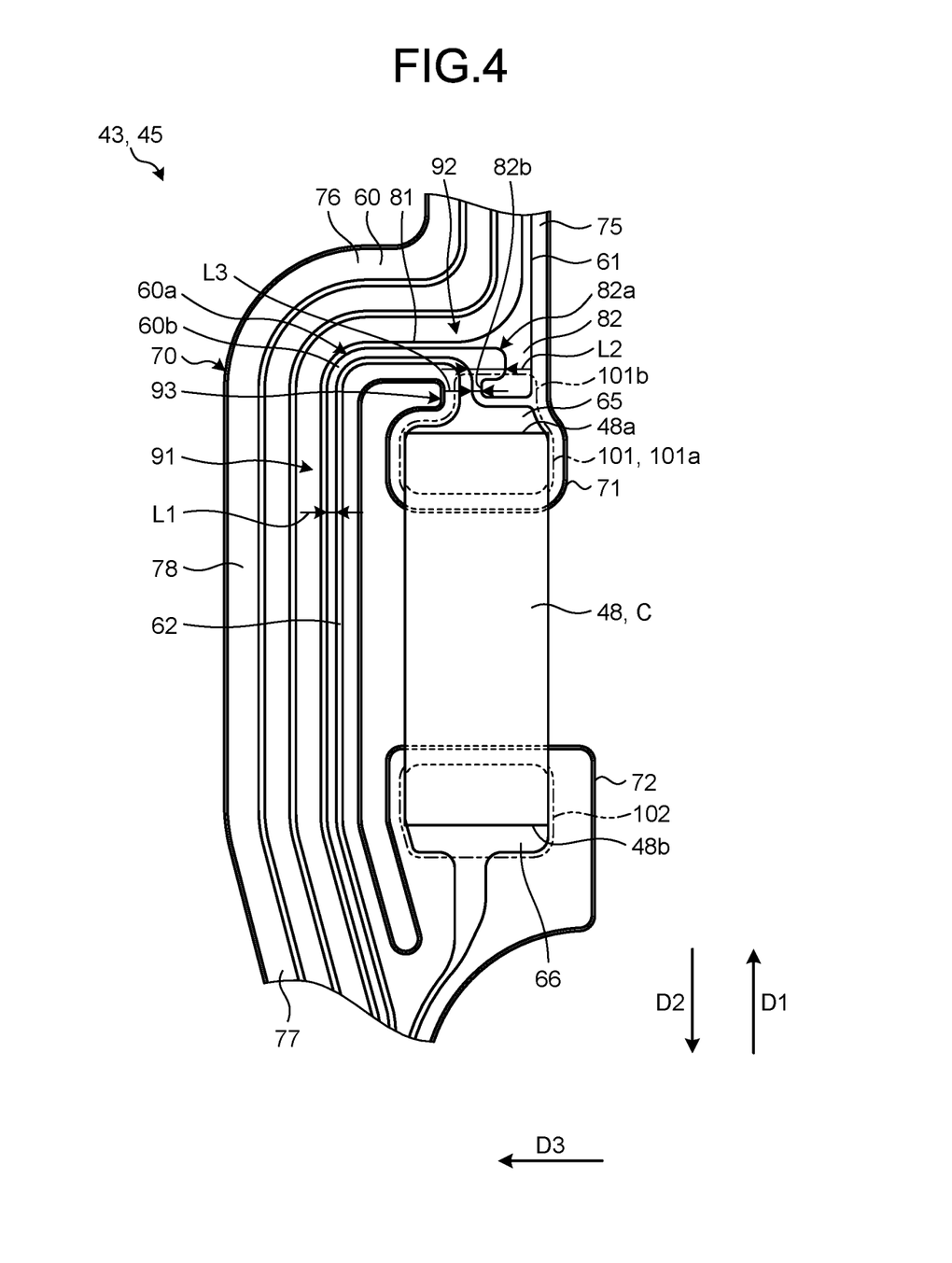
FIG. 4 is an exemplary plan view illustrating part of a gimbal portion of the first embodiment.

FIG. 4 is an exemplary plan view illustrating part of a gimbal portion 45 of the first embodiment. As illustrated in FIG. 4, the flexure 43 further includes a first terminal 65 and a second terminal 66. The first terminal 65 is an example of a terminal. The first terminal 65 and the second terminal 66 are provided on the surface 60. For example, the first terminal 65 and the second terminal 66 are pads of the conduction layer, and are exposed through holes provided on the protection layer forming the surface 60.

The first terminal 65 is apart from the second terminal 66 in the first direction D1. One terminal 48a of the second MA 48 is electrically connected to the first terminal 65. The terminal 48a is provided in the end portion of the second MA 48 in the first direction D1. For example, the terminal 48a is electrically connected to a ground.

The other terminal 48b of the second MA 48 is electrically connected to the second terminal 66. The terminal 48b is provided in the end portion of the second MA 48 in the second direction D2. According to this, the second MA 48 is mounted on the surface 60. A voltage for controlling the second MA 48 is applied to the terminal 48b. The second MA 48 extends in the first direction D1 and the second direction D2.

A plurality of electronic components C including the magnetic head 14 and the second MA 48 are mounted on the surface 60. In a case that the second MA 48 is omitted, one electronic component C, which is the magnetic head 14, may be mounted on the surface 60. That is, at least one of the electronic components C is mounted on the surface 60. The electronic components C are not limited to the magnetic head 14 and the second MA 48, and may include, for example, a laser element used in a heat-assisted magnetic recording method (HAMR).

The first wiring 61 and the second wiring 62 are wiring patterns of the conduction layer between the insulation layer and the protection layer of the flexure 43. Therefore, the first wiring 61 and the second wiring 62 extend along the surface 60. The conduction layer of the flexure 43 further includes a plurality of other wirings as well as the first wiring 61 and the second wiring 62.

The first wiring 61, the second wiring 62, and the other wirings are covered by the protection layer of the flexure 43. FIGS. 3 and 4 illustrate the first wiring 61, the second wiring 62, and the other wirings with solid lines for the sake of description.

A conduction layer including the first wiring 61, the second wiring 62, and the other wirings is provided on a substantially flat metal plate and the insulation layer. Further, the protection layer covers the conduction layer, and forms the surface 60 of the flexure 43. Therefore, the surface 60 swells at places in which the first wiring 61, the second wiring 62, and the other wirings are provided. As described above, the surface 60 has fine irregularities.

The first wiring 61 connects, for example, the magnetic head 14 and the terminal of the flexure 43, which is connected to the FPC 18. The first wiring 61 is apart from the second MA 48. The second wiring 62 connects the first terminal 65 and the terminal of the flexure 43, which is connected to the FPC 18. Therefore, the second wiring 62 is connected to the second MA 48. The first wiring 61 and the second wiring 62 are not limited to this example.

The gimbal portion 45 of the flexure 43, on which the second MA 48 is mounted, includes a peripheral portion 70, a first connection portion 71, and a second connection portion 72. The peripheral portion 70 is an example of a base portion. The peripheral portion 70 includes a first belt portion 75, a second belt portion 76, a third belt portion 77, and a fourth belt portion 78. The second belt portion 76 is an example of a first base portion. The third belt portion 77 is an example of a second base portion. The fourth belt portion 78 is an example of an intermediate portion.

The first belt portion 75 is apart from the second MA 48 in the first direction D1, and extends in the first direction D1 (or the second direction D2). The second belt portion 76 extends from the end portion of the first belt portion 75 in the second direction D2 toward a third direction D3. The third direction D3 is a direction orthogonal to the first direction D1 and the second direction D2, and is a direction along the surface 60.

The third belt portion 77 is apart from the second MA 48 in the second direction D2. The fourth belt portion 78 extends in the first direction D1 (or the second direction D2) along the second MA 48 in a position apart from the second MA 48 in the third direction D3. The fourth belt portion 78 is connected to the end portion of the second belt portion 76 in the third direction D3 and connected to the end portion of the third belt portion 77 in the third direction D3. In other words, the fourth belt portion 78 connects the second belt portion 76 and the third belt portion 77.

The first belt portion 75, the second belt portion 76, the third belt portion 77, and the fourth belt portion 78 are apart from the second MA 48, and surround the second MA 48 from three sides. In this way, the peripheral portion 70 is formed in a substantially C-shape. The second MA 48 is surrounded by the peripheral portion 70 in a position apart from the peripheral portion 70.

The first connection portion 71 protrudes from the second belt portion 76 in the second direction D2. The first connection portion 71 is apart from the third belt portion 77 and the fourth belt portion 78. In the first connection portion 71, the first terminal 65 is provided on the surface 60. The terminal 48a of the second MA 48 is connected to the first terminal 65 of the first connection portion 71. That is, the terminal 48a in the end portion of the second MA 48 in the first direction D1 is connected to the first connection portion 71.

The second connection portion 72 protrudes from the third belt portion 77 in the first direction D1. The second connection portion 72 is apart from the second belt portion 76 and the fourth belt portion 78. In the second connection portion 72, the second terminal 66 is provided on the surface 60. The terminal 48b of the second MA 48 is connected to the second terminal 66 of the second connection portion 72. That is, the terminal 48b in the end portion of the second MA 48 in the second direction D2 is connected to the second connection portion 72.

The first wiring 61 includes a first extension portion 81 and a second extension portion 82. The first extension portion 81 is provided on the peripheral portion 70. For example, the first extension portion 81 extends along the first belt portion 75, the second belt portion 76, the third belt portion 77, and the fourth belt portion 78.

The second extension portion 82 protrudes from the first extension portion 81, and is provided on the first connection portion 71. Part of the second extension portion 82 may be provided on the peripheral portion 70. The second extension portion 82 protrudes in the second direction D2 from, for example, the first extension portion 81 provided on the second belt portion 76. The second extension portion 82 extends to the vicinity of the first terminal 65 from the first extension portion 81. The second extension portion 82 is apart from the first terminal 65.

The second extension portion 82 is wider than the first extension portion 81. In other words, the width of the second extension portion 82 is larger than the width of the first extension portion 81. The width of the first extension portion 81 refers to the length of the first extension portion 81 in a direction orthogonal to the extension direction of the first extension portion 81 along the surface 60. In the present embodiment, the width of the first extension portion 81 is substantially constant. The width of the first extension portion 81 may be changed.

The width of the second extension portion 82 refers to the length of the second extension portion 82 in a direction orthogonal to the extension direction of the second extension portion 82 along the surface 60. In the present embodiment, the width of the second extension portion 82 is the length of the second extension portion 82 in the third direction D3.

As described above, the second wiring 62 is connected to the first terminal 65. Therefore, the second wiring 62 extends along the first connection portion 71, and the second belt portion 76, the third belt portion 77, and the fourth belt portion 78 of the peripheral portion 70.

The first wiring 61 and the second wiring 62 extend side by side. In other words, the first wiring 61 and the second wiring 62 are adjacent to and spaced from each other. The flexure 43 includes a first portion 91, a second portion 92, and a third portion 93, whose distances between the first wiring 61 and the second wiring 62 are different from one another.

The first portion 91 is provided in a position apart from the second MA 48. In the present embodiment, the first portion 91 is provided on the second belt portion 76, the third belt portion 77, and the fourth belt portion 78. In the first portion 91, the first wiring 61 and the second wiring 62 extend side by side with a substantially constant distance L1. The distance L1 between the first wiring 61 and the second wiring 62 in the first portion 91 may partly change.

The second portion 92 is positioned between the first portion 91 and the second MA 48. In the present embodiment, the second portion 92 is provided on the first connection portion 71 and the second belt portion 76. The second portion 92 is positioned between the first portion 91 and the second MA 48 in a path of the second wiring 62. Therefore, a spatial position of the second portion 92 may not be between the first portion 91 and the second MA 48.

In the second portion 92, the distance between the first wiring 61 and the second wiring 62 is larger than that in the first portion 91. That is, a distance L2 between the first wiring 61 and the second wiring 62 in the second portion 92 is larger than the distance L1 between the first wiring 61 and the second wiring 62 in the first portion 91.

The distance L2 between the first wiring 61 and the second wiring 62 in the second portion 92 may partly change. In this case, a maximum value of the distance L2 between the first wiring 61 and the second wiring 62 in the second portion 92 is larger than a minimum value of the distance L1 between the first wiring 61 and the second wiring 62 in the first portion 91.

The third portion 93 is positioned between the second portion 92 and the second MA 48. In the present embodiment, the third portion 93 is provided on the first connection portion 71. The third portion 93 is positioned between the second portion 92 and the second MA 48 in the path of the second wiring 62. Therefore, a spatial position of the third portion 93 may not be between the second portion 92 and the second MA 48.

In the third portion 93, the distance between the first wiring 61 and the second wiring 62 is shorter than that in the second portion 92. Specifically, a distance L3 between the first wiring 61 and the second wiring 62 in the third portion 93 is shorter than the distance L2 between the first wiring 61 and the second wiring 62 in the second portion 92. In the present embodiment, the distance L3 is substantially equal to the distance L1.

The distance L3 between the first wiring 61 and the second wiring 62 in the third portion 93 may partly change. In this case, a minimum value of the distance L3 between the first wiring 61 and the second wiring 62 in the third portion 93 is smaller than the maximum value of the distance L2 between the first wiring 61 and the second wiring 62 in the second portion 92.

In the present embodiment, in the second portion 92, a recess portion 82a is provided in the second extension portion 82 of the first wiring 61. The recess portion 82a is recessed from an edge 82b of the second extension portion 82 facing the second wiring 62 in a direction away from the second wiring 62. By forming the recess portion 82a, the distance L2 between the first wiring 61 and the second wiring 62 in the second portion 92 becomes longer. The recess portion 82a may be provided in other portions of the first wiring 61.

As illustrated in FIG. 4, the suspension 37 further includes a first adhesive 101 and a second adhesive 102. The first adhesive 101 is an example of an adhesive. FIG. 4 illustrates the first adhesive 101 and the second adhesive 102 with a two-dot chain line for the sake of description.

In the present embodiment, the first adhesive 101 and the second adhesive 102 are conductive adhesives. For example, the first adhesive 101 and the second adhesive 102 are epoxy-based adhesives with which a conductive filler such as silver is mixed.

The first adhesive 101 attaches the terminal 48a of the second MA 48 to the surface 60 and the first terminal 65 of the first connection portion 71. According to this, the first adhesive 101 electrically connects the terminal 48a of the second MA 48 and the first terminal 65.

The second adhesive 102 attaches the terminal 48b of the second MA 48 to the surface 60 and the second terminal 66 of the second connection portion 72. According to this, the second adhesive 102 electrically connects the terminal 48b of the second MA 48 and the second terminal 66.

The first adhesive 101 and the second adhesive 102 may be insulating adhesives. In this case, for example, the second MA 48, and the first terminal 65 and the second terminal 66 are electrically connected by direct contact or indirectly via a conductor such as solder.

The first adhesive 101 includes an adhesive portion 101a and an external portion 101b. The adhesive portion 101a is a portion that the second MA 48 is attached to the surface 60 in the first adhesive 101. The adhesive portion 101a is positioned between the second MA 48 and the surface 60. The adhesive portion 101a may include a portion that the edge of the second MA 48 is attached to the surface 60 in the first adhesive 101.

The external portion 101b is a portion extending along the surface 60 from the adhesive portion 101a. The external portion 101b is apart from the second MA 48. The external portion 101b covers part of the first wiring 61 and part of the second wiring 62. For example, the external portion 101b covers the second extension portion 82 of the first wiring 61 and the second wiring 62 in the first connection portion 71. A protection layer of the flexure 43 is interposed between the first wiring 61 and the second wiring 62, and the first adhesive 101 to inhibit a short circuit from occurring.

Not only the external portion 101b, but also the adhesive portion 101a may cover part of the first wiring 61 and part of the second wiring 62. The first adhesive 101 may not include the external portion 101b. For example, the external portion 101b is formed by pressing the second MA 48 against the first adhesive 101 at the time of manufacturing. The external portion 101b may not be formed depending on a pressure at which the second MA 48 presses the first adhesive 101 or a volume of the first adhesive 101.

The second portion 92 is positioned closer to the adhesive portion 101a than the first portion 91. The third portion 93 is positioned closer to the adhesive portion 101a than the second portion 92. The adhesive portion 101a may cover the third portion 93.

As described above, the surface 60 swells at a place in which the first wiring 61 is provided, and at a place in which the second wiring 62 is provided. Therefore, a groove (recess portion) 60a recessed on the surface 60 is provided between the first wiring 61 and the second wiring 62.

The groove 60a extends from the first connection portion 71 to the second belt portion 76, the third belt portion 77, and the fourth belt portion 78 along the first wiring 61 and the second wiring 62. That is, the groove 60a extends from the vicinity of the second MA 48.

The external portion 101b of the first adhesive 101 covers part of the groove 60a by covering the first wiring 61 and the second wiring 62, and is in contact with an inner surface 60b of the groove 60a. The inner surface 60b is part of the surface 60 which forms the groove 60a. The first adhesive 101 may be in contact with the inner surface 60b of the groove 60a without covering at least one of the first wiring 61 and the second wiring 62. The first adhesive 101 is a liquid before being cured in a manufacturing process of the HDD 10. Therefore, there is a possibility that part of the first adhesive 101, which is a liquid, flows out from the adhesive portion 101a and the external portion 101b along the groove 60a due to the capillary phenomenon.

For example, part of the first adhesive 101 flows out from the adhesive portion 101a and the external portion 101b along the groove 60a between the first wiring 61 and the second wiring 62 in the third portion 93. However, in the second portion 92, the distance between the first wiring 61 and the second wiring 62 increases. In other words, in the second portion 92, the width of the groove 60a increases. The distance that the liquid flows due to the capillary phenomenon is inversely proportional to the diameter (width) of a capillary. Therefore, the second portion 92 inhibits the first adhesive 101 from further flowing along the groove 60a and retains the first adhesive 101. In other words, the second portion 92 absorbs the excess first adhesive 101.

As described above, the second portion 92 is positioned closer to the adhesive portion 101a of the first adhesive 101 than the first portion 91. Therefore, the first adhesive 101 flowing out from the adhesive portion 101a and the external portion 101b along the groove 60a is retained in the second portion 92 before reaching the first portion 91.

Rigidity of the portion to which the first adhesive 101 is attached in the flexure 43 is increased by curing the first adhesive 101. There is a possibility that a change in the rigidity of the flexure 43 reduces flexibility of the gimbal portion 45, and hinders a posture control of the magnetic head 14 mounted on the gimbal portion 45. However, in the present embodiment, since the second portion 92 retains the first adhesive 101, the change in the rigidity of the flexure 43 due to the first adhesive 101 is reduced.

There is a possibility that a piece of the first adhesive 101 that has flowed out along the groove 60a is peeled off from the surface 60. The wider the area in which the first adhesive 101 has flowed out along the groove 60a, the more likely it is that the piece of the first adhesive 101 is peeled off. However, in the present embodiment, since the second portion 92 retains the first adhesive 101, the possibility that the piece of the first adhesive 101 is peeled off is reduced.

In the HDD 10 according to the first embodiment described above, the surface 60 of the flexure 43 swells at a place in which the first wiring 61 is provided and at a place in which the second wiring 62 is provided. Therefore, the groove 60a recessed on the surface 60 is formed between the first wiring 61 and the second wiring 62. The first adhesive 101 is positioned between the second MA 48 and the surface 60, and includes an adhesive portion attaching the second MA 48 to the surface 60. The first adhesive 101 is in contact with the inner surface 60b of the groove 60a provided on the surface 60 between the first wiring 61 and the second wiring 62. In a case that the distance between the first wiring 61 and the second wiring 62 is short and substantially constant, there is a possibility that the first adhesive 101 flows out from the adhesive portion 101a along the groove 60a between the first wiring 61 and the second wiring 62 due to the capillary phenomenon. However, the flexure 43 in the present embodiment includes the first portion 91 and the second portion 92. The first portion 91 is provided in a position apart from the second MA 48. The first wiring 61 and the second wiring 62 in the first portion 91 extend side by side. The second portion 92 is positioned closer to the adhesive portion 101a than the first portion 91. A distance between the first wiring 61 and the second wiring 62 is larger than that in the first portion 91. With this structure, the first adhesive 101 is retained in the second portion 92 that the distance between the first wiring 61 and the second wiring 62 is large, and it becomes difficult for the first adhesive 101 to flow out to the first portion 91. Therefore, in the HDD 10 of the present embodiment, the first adhesive 101 is inhibited from flowing out over a wide range. That is, the range in which the first adhesive 101 flows out can be controlled by the position in which the second portion 92 is provided. By inhibiting the outflow of the first adhesive 101, in the HDD 10 of the present embodiment, the first adhesive 101 can be inhibited from changing the mechanical property such as the rigidity of the flexure 43, and thus can be inhibited from hindering the posture control of the magnetic head 14 mounted on the flexure 43. In the HDD 10 of the present embodiment, the first adhesive 101 which has flowed out can be inhibited from reducing the parts cleanliness of the flexure 43, and thus the first adhesive 101 which has flowed out can be inhibited from being peeled off. Therefore, contamination inside the HDD 10 due to the first adhesive 101 which has been peeled off is inhibited.

In the second portion 92, the recess portion 82a recessed to be away from the second wiring 62 is provided on the first wiring 61. By providing the recess portion 82a, the distance L2 between the first wiring 61 and the second wiring 62 becomes larger in the second portion 92. Therefore, the first adhesive 101 is retained in the recess portion 82a of the second portion 92, and it becomes difficult for the first adhesive 101 to flow out to the first portion 91.

The flexure 43 includes the third portion 93 that is positioned closer to the adhesive portion 101a than the second portion 92. The distance between the first wiring 61 and the second wiring 62 in the third portion 93 is shorter than that in the second portion 92. With this structure, the first adhesive 101 flows toward the second portion 92 via the third portion 93. Therefore, the third portion 93 can inhibit the first adhesive 101 from flowing out in an unexpected direction.

The first adhesive 101 is conductive, and electrically connects the second MA 48 to the first terminal 65 of the flexure 43. With this structure, a manufacturing process of electrically connecting the second MA 48 to the first terminal 65 separately is not necessary, and the number of manufacturing processes of the HDD 10 is reduced. Further, the first adhesive 101 can electrically connect the second MA 48 to the first terminal 65 even when heat resistance of the second MA 48 is low.

The first adhesive 101 attaches the second MA 48, which is a piezoelectric element, to the surface 60. That is, in the HDD 10 of the present embodiment, the first adhesive 101 is inhibited from flowing out over a wide range in a vicinity of the piezoelectric element. Therefore, in the HDD 10 of the present embodiment, the first adhesive 101 can be inhibited from changing the rigidity of the gimbal portion 45 of the flexure 43 bent by the second MA 48 being the piezoelectric element. Thus, the first adhesive 101 can be inhibited from hindering the posture control of the magnetic head 14 mounted on the flexure 43.

The flexure 43 includes the peripheral portion 70 and the first connection portion 71. The peripheral portion 70 is apart from the second MA 48. The first connection portion 71 protrudes from the peripheral portion 70 in the second direction D2 and is connected to the terminal 48a of the end portion of the second MA 48 in the first direction D1. The first wiring 61 includes the first extension portion 81 provided in the peripheral portion 70, and the second extension portion 82 that protrudes from the first extension portion 81. The second extension portion 82 is provided in the first connection portion 71, and is wider than the first extension portion 81. The first wiring 61 is apart from the second MA 48. The second wiring 62 is connected to the second MA 48. The second MA 48 extends in the first direction D1 to push the first connection portion 71 in the first direction D1. Generally, since the first wiring 61 and the second wiring 62 are made of metal, the rigidity of the first connection portion 71 is improved as the first wiring 61 and the second wiring 62 in the first connection portion 71 are larger. The first connection portion 71 of the present embodiment can efficiently transmit force of the second MA 48 to the peripheral portion 70 by providing the wider second extension portion 82 in the first connection portion 71. By transmitting the force of the second MA 48 to the peripheral portion 70, the gimbal portion 45 is bent depending on the expansion and contraction of the second MA 48, and the magnetic head 14 can be moved to a desired position.

The peripheral portion 70 includes the second belt portion 76 from which the first connection portion 71 protrudes, the third belt portion 77 from which the second connection portion 72 protrudes, and the fourth belt portion 78 that connects the second belt portion 76 and the third belt portion 77. The second portion 92 is provided in at least one of the first connection portion 71, the second belt portion 76, and the fourth belt portion 78. Therefore, in the HDD 10 of the present embodiment, the first adhesive 101 can be inhibited from flowing out widely to the third belt portion 77.

Second Embodiment

The second embodiment will be described below with reference to FIG. 5. In the following description of a plurality of embodiments, constituent element having the same function as the constituent element already described may be denoted by the same reference numeral as those described above, and the description may be omitted. The constituent elements denoted by the same reference numerals do not necessarily have all the functions and properties in common, and may have different functions and properties according to each embodiment.

Figure 5:
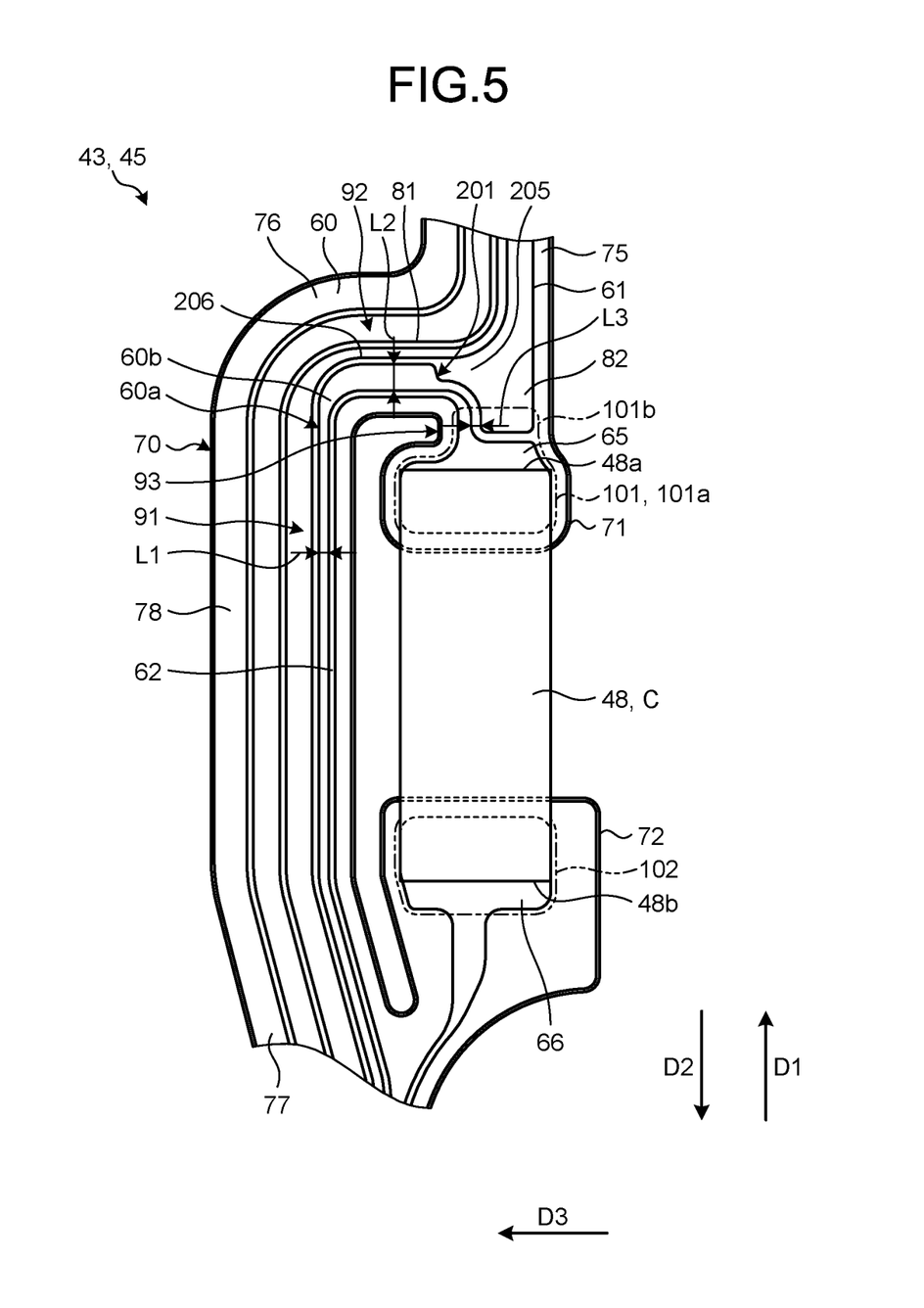
FIG. 5 is an exemplary plan view illustrating part of a gimbal portion of a second embodiment.

FIG. 5 is an exemplary plan view illustrating part of the gimbal portion 45 of the second embodiment. As illustrated in FIG. 5, in the second embodiment, the recess portion 82a is not provided in the second extension portion 82. According to this, the rigidity of the first connection portion 71 is enhanced, and the force of the second MA 48 can be efficiently transmitted to the peripheral portion 70.

The second portion 92 of the second embodiment is provided in the second belt portion 76. The second portion 92 includes an enlargement portion 201. The enlargement portion 201 is an end portion of the second portion 92 connected to the third portion 93. In the enlargement portion 201, a distance L2 between the first wiring 61 and the second wiring 62 increases as being away from the third portion 93.

In a portion between the enlargement portion 201 and the first portion 91 of the second portion 92, the distance L2 between the first wiring 61 and the second wiring 62 is set to be substantially constant. The second portion 92 is not limited to this example.

The first wiring 61 includes a wide portion 205 and a narrow portion 206. The width of the wide portion 205 is larger than the width of the narrow portion 206. The width of the narrow portion 206 is substantially equal to the width of the second wiring 62. The wide portion 205 is provided in the third portion 93. The narrow portion 206 is provided in the first portion 91 and the second portion 92.

As illustrated in FIG. 5, in the enlargement portion 201, the wide portion 205 and the narrow portion 206 are connected with each other. In other words, the change in the width of the first wiring 61 between the wide portion 205 and the narrow portion 206 causes the change in the distance L2 between the first wiring 61 and the second wiring 62, and thereby the enlargement portion 201 is formed. The enlargement portion 201 is not limited to this example, and for example, the distance L2 between the first wiring 61 and the second wiring 62 may be changed by bending the first wiring 61 having a substantially constant width, and the enlargement portion 201 may be formed.

In the HDD 10 of the second embodiment described above, the second portion 92 is connected to the third portion 93, and includes the enlargement portion 201 in which the distance L2 between the first wiring 61 and the second wiring 62 increases as being away from the third portion 93. With this structure, the first adhesive 101 is retained in the enlargement portion 201 of the second portion 92, and it becomes difficult for the first adhesive 101 to flow out to the first portion 91.

Third Embodiment

Figure 6:
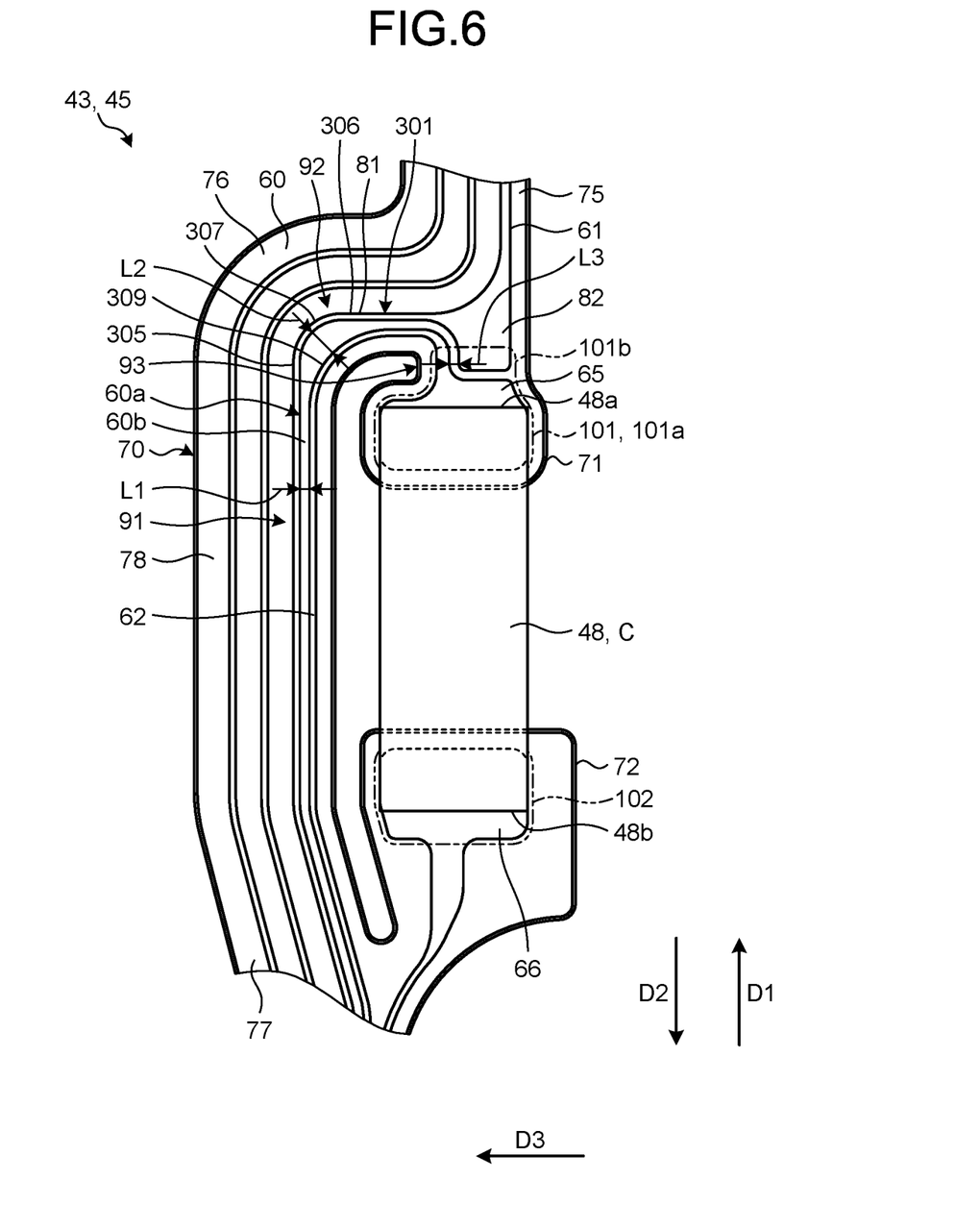
FIG. 6 is an exemplary plan view illustrating part of a gimbal portion of a third embodiment.

The third embodiment will be described below with reference to FIG. 6. FIG. 6 is an exemplary plan view illustrating part of the gimbal portion 45 of the third embodiment. As illustrated in FIG. 6, the second portion 92 of the third embodiment is provided in the second belt portion 76 and the fourth belt portion 78. The second portion 92 includes an enlargement portion 301. The enlargement portion 301 is an end portion of the second portion 92 connected to the third portion 93. In the enlargement portion 301, a distance L2 between the first wiring 61 and the second wiring 62 increases as being away from the third portion 93.

The width of the first extension portion 81 of the first wiring 61 in the third embodiment is set to be substantially constant. In the second portion 92 of the third embodiment, the first wiring 61 includes a first straight portion 305, a second straight portion 306, and a first bent portion 307.

The first straight portion 305 is provided in the fourth belt portion 78, and extends linearly along the fourth belt portion 78. The first straight portion 305 is connected to the first wiring 61 of the first portion 91. The second straight portion 306 is provided in the second belt portion 76, and extends linearly along the second belt portion 76. A direction that the first straight portion 305 extends and a direction that the second straight portion 306 extends intersect each other. The second straight portion 306 is connected to the first wiring 61 of the third portion 93.

The first bent portion 307 connects the first straight portion 305 and the second straight portion 306. The first bent portion 307 extends in an arc shape along a portion in which the second belt portion 76 and the fourth belt portion 78 are connected with each other.

The second wiring 62 includes a second bent portion 309 in the second portion 92. The second bent portion 309 extends in an arc shape along a portion in which the second belt portion 76 and the fourth belt portion 78 are connected with each other. The second bent portion 309 has a curvature radius larger than that of the first bent portion 307.

The second straight portion 306, the first bent portion 307, and the second bent portion 309 are provided in the enlargement portion 301. A distance L2 between the second straight portion 306 of the first wiring 61 and the second bent portion 309 of the second wiring 62 increases as being away from the third portion 93. Moreover, a distance L2 between the first bent portion 307 of the first wiring 61 and the second bent portion 309 of the second wiring 62 further increases as being away from the third portion 93.

In the HDD 10 of the third embodiment described above, in the second portion 92, the first wiring 61 includes the first straight portion 305 extending linearly, the second straight portion 306 extending linearly, and the first bent portion 307 connecting the first straight portion 305 and the second straight portion 306 and extending in an arc shape. In the second portion 92, the second wiring 62 includes the second bent portion 309 extending in an arc shape and having a curvature radius larger than that of the first bent portion 307. With this structure, the second portion 92 can be efficiently provided in a portion that the first wiring 61 and the second wiring 62 are bent.

Fourth Embodiment

Figure 7:
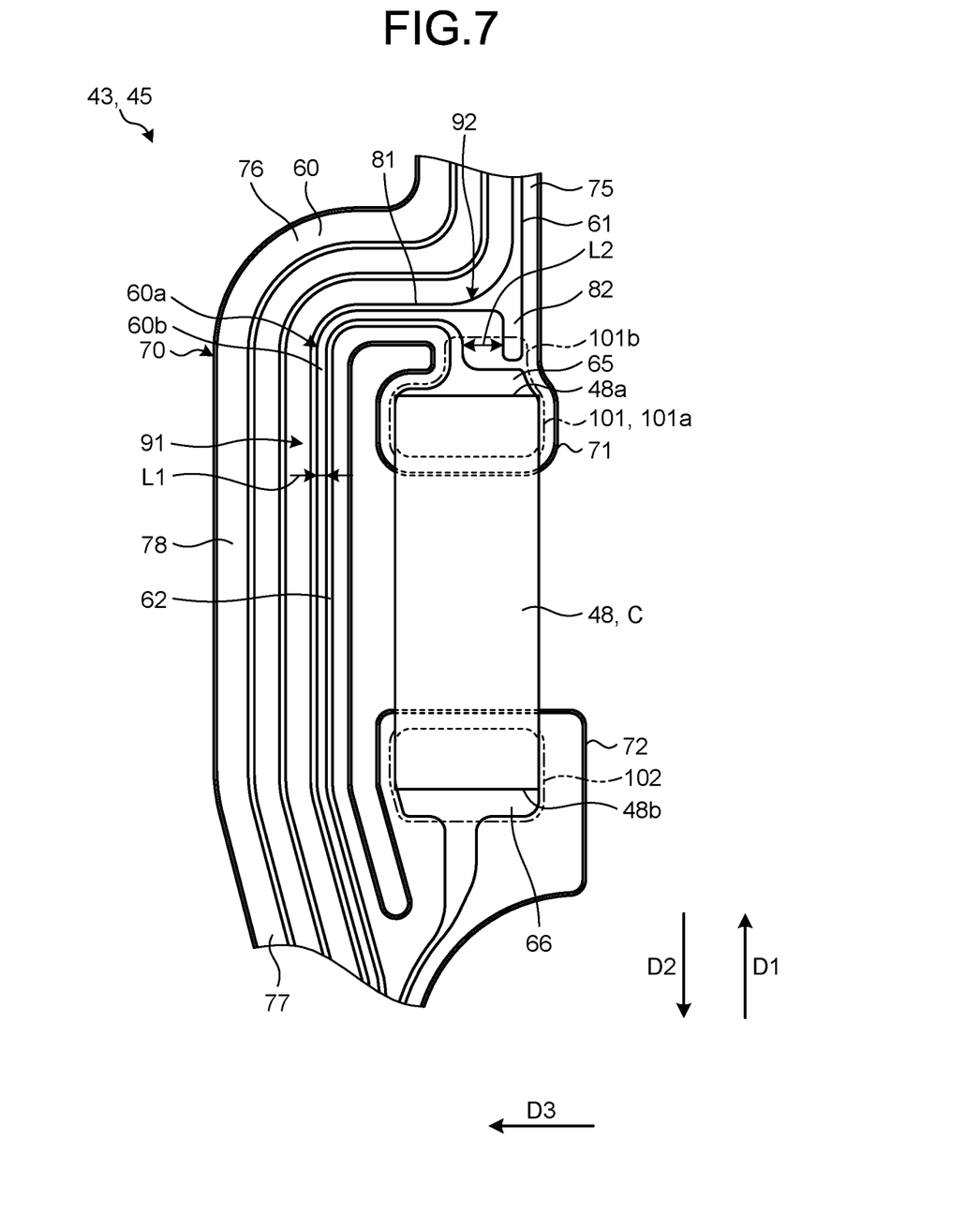
FIG. 7 is an exemplary plan view illustrating part of a gimbal portion of a fourth embodiment.

The fourth embodiment will be described below with reference to FIG. 7. FIG. 7 is an exemplary plan view illustrating part of the gimbal portion 45 of the fourth embodiment. As illustrated in FIG. 7, the flexure 43 of the fourth embodiment includes the first portion 91 and the second portion 92 except the third portion 93. The second portion 92 is provided in the first connection portion 71, and adjacent to the second MA 48. In other words, in the fourth embodiment, the third portion 93 is not provided between the second portion 92 and the second MA 48.

In the HDD 10 of the fourth embodiment described above, the second portion 92 is adjacent to the second MA 48. According to this structure, the first adhesive 101 is retained in the second portion 92 adjacent to the second MA 48. Therefore, in the disk device of the present embodiment, the first adhesive 101 can be inhibited from flowing out.

In the embodiments described above, the first wiring 61 is apart from the second MA 48, and the second wiring 62 is connected to the second MA 48. Alternatively, both the first wiring 61 and the second wiring 62 may be connected to the second MA 48, and both the first wiring 61 and the second wiring 62 may be apart from the second MA 48.

In the embodiments described above, the first adhesive 101 that attaches the second MA 48 to the surface 60 is described in detail. However, for example, the adhesive that attaches another electronic component C such as a magnetic head 14 or a laser element to the surface 60 may be in contact with the inner surface of the groove provided on the surface 60 between the two wirings. In this case, the flexure 43 includes a first portion that is provided in a position apart from the electronic component C and in which the two wirings extend side by side, and a second portion that is positioned between the first portion and the electronic component C and in which a distance between the two wirings is larger than that in the first portion.

According to at least one embodiment described above, the surface of the flexure swells at a place in which the first wiring is provided and at a place in which the second wiring is provided. Therefore, the groove recessed on the surface is formed between the first wiring and the second wiring. The adhesive attaches one of the at least one electronic component to the surface and is in contact with the inner surface of the groove provided on the surface between the first wiring and the second wiring. In a case that the distance between the first wiring and the second wiring is short and substantially constant, there is a possibility that the adhesive flows out along the groove between the first wiring and the second wiring due to the capillary phenomenon. In contrast, the flexure in the present embodiment includes the first portion that is provided in a position apart from the electronic component and in which the first wiring and the second wiring extend side by side, and the second portion that is positioned between the first portion and the electronic component and in which a distance between the first wiring and the second wiring is larger than that in the first portion. According to this, the adhesive is retained in the second portion that the distance between the first wiring and the second wiring is large, and it becomes difficult for the adhesive to flow out to the first portion. Therefore, in the disk device of the present embodiment, the adhesive can be inhibited from flowing out over a wide area. By inhibiting the outflow of the adhesive, for example, in the disk device of the present embodiment, the adhesive can be inhibited from changing mechanical property such as the rigidity of the flexure, and thus can inhibited from hindering the posture control of the magnetic head mounted on the flexure. In the disk device of the embodiment, the adhesive which has flowed out can be inhibited from reducing the cleanliness of the flexure, and thus the adhesive which has flowed out can be inhibited from being peeled off.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A disk device comprising:
   a disk-shaped recording medium including a recording layer;
   one or more electronic components including a magnetic head configured to read information from the recording medium and write information to the recording medium;
   a flexible flexure including
      a surface on which the one or more electronic components are mounted,
      a first wiring extending along the surface,
      a second wiring extending along the surface, and
      a groove provided on the surface between the first wiring and the second wiring; and
   an adhesive including an adhesive portion and being in contact with an inner surface of the groove, the adhesive portion being positioned between the surface and one of the one or more electronic components and attaching the one electronic component to the surface, wherein the flexure includes
      a first portion provided in a position apart from the electronic component, the first wiring and the second wiring in the first portion extending side by side, and
      a second portion positioned closer to the adhesive portion than the first portion, a distance between the first wiring and the second wiring in the second portion being larger than that in the first portion.
2. The disk device according to claim 1, wherein the first wiring in the second portion includes a recess portion recessed to be away from the second wiring.
3. The disk device according to claim 1, wherein the flexure includes a third portion positioned closer to the adhesive portion than the second portion, a distance between the first wiring and the second wiring in the third portion being shorter than that in the second portion.
4. The disk device according to claim 3, wherein the second portion includes an enlargement portion connected to the third portion, a distance between the first wiring and the second wiring in the enlargement portion increasing as being away from the third portion.
5. The disk device according to claim 3, wherein
   the first wiring in the second portion includes a first straight portion extending linearly, a second straight portion extending linearly, and a first bent portion connecting the first straight portion and the second straight portion and extending in an arc shape, and
   the second wiring in the second portion includes a second bent portion extending in an arc shape and having a curvature radius larger than a curvature radius of the first bent portion.
6. The disk device according to claim 1, wherein the second portion is adjacent to the one of the one or more electronic components.
7. The disk device according to claim 1, wherein
   the flexure includes a terminal provided on the surface, and
   the adhesive is conductive and electrically connects the terminal and the one of the one or more electronic components.
8. The disk device according to claim 1, wherein
   the one or more electronic components include a piezoelectric element capable of expanding and contracting in a first direction and a second direction opposite to the first direction, and
   the adhesive attaches the piezoelectric element to the surface.
9. The disk device according to claim 8, wherein
   the flexure includes a base portion apart from the piezoelectric element, a first connection portion protruding from the base portion in the second direction and being connected to an end portion of the piezoelectric element in the first direction, and a second connection portion protruding from the base portion in the first direction and being connected to an end portion of the piezoelectric element in the second direction,
   the first wiring includes a first extension portion provided in the base portion, and a second extension portion protruding from the first extension portion, the second extension portion being provided to the first connection portion and being wider than the first extension portion,
   the first wiring is apart from the piezoelectric element, and
   the second wiring is connected to the piezoelectric element.
10. The disk device according to claim 9, wherein
   the base portion includes a first base portion from which the first connection portion protrudes, a second base portion from which the second connection portion protrudes, and an intermediate portion connecting the first base portion and the second base portion, and the second portion is provided in at least one of the first connection portion, the first base portion, and the intermediate portion.

\* \* \* \* \*